US012285781B2

(12) United States Patent
Okazaki et al.

(10) Patent No.: US 12,285,781 B2
(45) Date of Patent: Apr. 29, 2025

(54) OSCILLATORY ACTUATOR

(71) Applicant: FOSTER ELECTRIC COMPANY, LIMITED, Tokyo (JP)

(72) Inventors: Yoshikazu Okazaki, Tokyo (JP); Tatsushi Sasanuma, Tokyo (JP); Takafumi Asukagawa, Tokyo (JP); Yusuke Chiba, Tokyo (JP); Hajime Goto, Tokyo (JP); Akira Hara, Tokyo (JP); Ken Yamakami, Tokyo (JP)

(73) Assignee: FOSTER ELECTRIC COMPANY, LIMITED, Tokyo (JP)

( * ) Notice: Subject to any disclaimer, the term of this patent is extended or adjusted under 35 U.S.C. 154(b) by 246 days.

(21) Appl. No.: 18/035,756

(22) PCT Filed: Sep. 24, 2021

(86) PCT No.: PCT/JP2021/035064
§ 371 (c)(1),
(2) Date: May 8, 2023

(87) PCT Pub. No.: WO2022/102259
PCT Pub. Date: May 19, 2022

(65) Prior Publication Data

US 2024/0009701 A1 Jan. 11, 2024

(30) Foreign Application Priority Data

Nov. 10, 2020 (JP) ................................ 2020-187107

(51) Int. Cl.
*B06B 1/04* (2006.01)

(52) U.S. Cl.
CPC .................................. *B06B 1/045* (2013.01)

(58) Field of Classification Search
CPC ................................ B06B 1/045; H02K 31/00
(Continued)

(56) References Cited

U.S. PATENT DOCUMENTS

| | | | | |
|---|---|---|---|---|
| 12,244,200 B2 * | 3/2025 | Chiba | .................... | H02K 33/18 |
| 2018/0006542 A1 * | 1/2018 | Choi | ...................... | H02K 33/02 |

(Continued)

FOREIGN PATENT DOCUMENTS

| | | |
|---|---|---|
| JP | 2016013554 | 1/2016 |
| JP | 2016028819 | 3/2016 |

(Continued)

OTHER PUBLICATIONS

"International Search Report (Form PCT/ISA/210) of PCT/JP2021/035064", mailed on Dec. 21, 2021, with English translation thereof, pp. 1-4.

*Primary Examiner* — Rashad H Johnson
(74) *Attorney, Agent, or Firm* — JCIPRNET

(57) ABSTRACT

A weight with optimum weight and high strength can be easily manufactured and the vibration actuator with excellent vibration characteristic is provided. The vibration actuator is formed by a casing 2 with cylindrical shape, a coil 21 provided in the casing 2, and a mover 4 that vibrates along an vibration-axis direction of the casing 2. The mover 4 includes a mover body and a weight fixed to the mover body. A protrusion 311 protruding toward an opening of the casing 2 is provided at a central portion of the mover body, and a recess 321 which is recessed toward the opening of the casing 2 is provided at the central portion of the weight 32. The mover body and the weight 32 is fixed in a state in which the protrusion 311 is inserted into the recess 321.

10 Claims, 8 Drawing Sheets

(58) Field of Classification Search
USPC .......................................... 310/12.14, 24, 25
See application file for complete search history.

(56) References Cited

U.S. PATENT DOCUMENTS

| | | | | |
|---|---|---|---|---|
| 2018/0229270 | A1* | 8/2018 | Nakazato | H02K 33/06 |
| 2018/0287475 | A1* | 10/2018 | Mori | H02K 33/02 |
| 2019/0052160 | A1* | 2/2019 | Oi | H02K 33/02 |
| 2019/0103796 | A1* | 4/2019 | Shim | H02K 33/04 |
| 2019/0131045 | A1* | 5/2019 | Nam | H01F 7/021 |
| 2019/0260278 | A1* | 8/2019 | Kim | H02K 33/18 |
| 2019/0267881 | A1* | 8/2019 | Matsuyama | H02K 33/18 |
| 2019/0312498 | A1* | 10/2019 | Murata | H02K 33/16 |
| 2020/0127547 | A1* | 4/2020 | Takahashi | H02K 33/18 |
| 2020/0136489 | A1* | 4/2020 | Park | H02K 41/0356 |
| 2020/0260190 | A1* | 8/2020 | Park | H04R 1/025 |
| 2020/0295647 | A1* | 9/2020 | Choi | H02K 33/12 |
| 2020/0381987 | A1* | 12/2020 | Takahashi | H02K 11/01 |
| 2021/0351680 | A1* | 11/2021 | Chiba | H02K 33/02 |
| 2021/0405752 | A1* | 12/2021 | Kim | H02K 33/16 |
| 2022/0029513 | A1* | 1/2022 | Lee | H02K 7/02 |
| 2022/0103052 | A1* | 3/2022 | Gomi | H02K 33/16 |
| 2022/0140718 | A1* | 5/2022 | Chiba | H02K 33/18<br>310/28 |
| 2023/0103219 | A1* | 3/2023 | Chiba | H02K 33/16<br>310/15 |
| 2023/0318425 | A1* | 10/2023 | Tsuchihashi | H02K 33/18<br>310/28 |
| 2023/0336064 | A1* | 10/2023 | Yamakami | B06B 1/045 |
| 2024/0009701 | A1* | 1/2024 | Okazaki | B06B 1/045 |
| 2024/0079942 | A1* | 3/2024 | Shimomura | G08B 6/00 |
| 2024/0113607 | A1* | 4/2024 | Liu | H02K 5/225 |
| 2024/0275252 | A1* | 8/2024 | Endo | H02K 33/18 |
| 2024/0275255 | A1* | 8/2024 | Endo | H02K 35/02 |
| 2024/0333117 | A1* | 10/2024 | Takahashi | B06B 1/04 |
| 2024/0396418 | A1* | 11/2024 | Sasanuma | B06B 1/045 |
| 2024/0421682 | A1* | 12/2024 | Mori | H02K 33/06 |
| 2025/0047161 | A1* | 2/2025 | Suizu | H02K 33/16 |
| 2025/0062669 | A1* | 2/2025 | Takahashi | H02K 11/014 |

FOREIGN PATENT DOCUMENTS

| | | |
|---|---|---|
| WO | 2019130705 | 7/2019 |
| WO | 2020045470 | 3/2020 |
| WO | 2020175610 | 9/2020 |

* cited by examiner

OSCILLATORY ACTUATOR

CROSS-REFERENCE TO RELATED APPLICATION

This application is a 371 of international application of PCT application serial no. PCT/JP2021/035064, filed on Sep. 24, 2021, which claims the priority benefit of japan application no. 2020-187107, filed on Nov. 10, 2020. The entirety of each of the above mentioned patent applications is hereby incorporated by reference herein and made a part of this specification.

TECHNICAL FIELD

The present disclosure relates to vibration actuators, and in particular, related to small-sized lightweight vibration actuators that are used in, for example, mobile terminals such as mobile phones and smart phones, and controllers for gaming devices.

RELATED ART

Conventionally, a vibration notification method using vibration actuators (or vibration motors) is used as a method to notify people of calls and alarms in communication devices such as mobile phones. And in recent years, vibration actuators are used in the fields of movies, games, and VR (Virtual Reality) as ways to produce effects in action scenes and to provide feedbacks to players, enhancing the reality by stimulating human sense of touch though vibration.

The vibration actuator may use a method in which vibration due to inertial force is produced by rotating an eccentric weight using a motor. However, since the method using the rotating motor produces the vibration by the inertial force of the eccentric weight, there is a disadvantage of slow response until the eccentric weight starts rotating to produce the vibration, diminishing the reality.

Accordingly, for example, the actuator to obtain more realistic sense of touch may be a voice-coil type actuator as indicated in Patent Document 1. In said vibration actuator, a mover having a magnet is arranged inside a cylindrical casing, a coil fixed to the casing is arranged around the mover, and power is conducted through the coil to reciprocate the mover inside the casing.

CITATION LIST

Patent Literature

Patent Document 1: JP 2016-28819

SUMMARY OF INVENTION

Technical Problem

In Patent Document 1, to fix a pole piece and a weight that are components of the mover, a through hole is provided in the pole piece, and a protrusion of the weight is inserted into the through hole. However, since the pole piece is a path of magnetic flux (magnetic path) generated by the magnet, it is not preferable to have the through hole which might interrupt the magnetic flux. In particular, since the through hole is at the center of the pole piece, the magnetic flux from the center of the magnet passes through the through hole and leaks to the air (outside the pole piece), which means that the magnetic power of the magnet cannot be used effectively.

Furthermore, considering, for example, weight of the weight and their balancing performance, a shape of the weight is not simply plate-shape, and has complex cross-section tall in the vibration-axis direction. Since it is impossible to produce such a weight as the simple plate-shaped weight, said weight is produced by molding methods such as forming the entire weight from resin molding, insert-molding metal into resin, die-casting in which molten metal is poured into a mold and is solidified, hot isostatic pressing in which metal powder is supplied into a mold and is solidified, and metal injection molding (metal injection). When producing the weight by such molding methods, if there is thin protrusion in the weight, space for the protrusion in the mold is smaller than those for other portions, such that it is difficult to pour or fill resin and metal material in such small space.

Furthermore, the magnet and the pole piece must be made of metal because they generate magnetic flux and become a magnetic path. On the other hand, it is suggested to produce a part or all of the weight from resin. That is, the mover supported by a spring coil may incline inside the casing and contact an inner surface of the casing or and the coil due to vibration and impact from outside when the vibration actuator is stationary. Therefore, it is suggested to increase the height of the weight in the vibration-axis direction or increase the outer diameter of the weight larger than that of the magnet, while using a resin weight or a weight at least partially, such as a surface, is covered by resin, so that the weight and the inner surface of the casing do not get damaged even when the weight contacts with the inner surface of the casing.

Furthermore, to facilitate adjustment of weight of the weight while preventing the damage of the mover and the casing as described above, the shape of the weight must be complex, such as a bowl-shape. In many cases of the weight in which the entire weight is formed by resin or in which metal is embedded inside resin by insert molding or other method, conventionally, the protrusion is also formed by resin. The resin protrusion of such a weight may be damaged when force is applied to said protrusion.

The present disclosure is proposed to address the above-described problem. The objective of the present disclosure is to facilitate manufacturing a weight with optimum weight and high strength and to provide a vibration actuator with excellent vibration characteristic.

Solution to Problem

A vibration actuator of the present disclosure has the following configuration.

(1) a casing with cylindrical shape;
(2) a coil provided in the casing;
(3) a mover that vibrates along a vibration-axis direction of the casing;
(4) the mover includes a mover body and a weight fixed to the mover body;
(5) a protrusion protruding toward an opening of the casing is provided at a central portion of the mover body;
(6) a recess which is recessed toward the opening of the casing is provided at a central portion of the weight;
(7) the mover body and the weight are fixed in a state in which the protrusion is inserted into the recess.

In the present disclosure, following configuration may be employed.

(1) The mover body includes a pole piece and a magnet;
(2) a diameter of the recess of the weight is larger than the diameter of a central shaft of the weight;
(3) the pole piece is fixed in the magnet at an opening-side of the casing, and a protrusion is provided at a center of the pole piece;
(4) the weight includes a bottomed cylinder in which a bottom expands in a direction orthogonal to a vibration axis and in which a cylinder is opened in a opening-side direction of the casing;
(5) in the present embodiment, the weight includes a pillar which extends toward an opening-side of the casing in the vibration-axis direction and which is integrated with the bottomed cylinder at the central portion thereof;
(6) an outer circumference of the cylinder of the bottomed cylinder is located at an outermost circumference of the mover;
(7) a rib is provided between a root of the pillar and the cylinder in the weight;
(8) a center of the rib is thicker than an outer circumference of the rib;
(9) a side surface of the opening of the casing of the rib is formed by at least two planes with different inclinations.

Effects of Invention

The present disclosure can facilitate manufacturing a weight with optimum weight and high strength and can provide a vibration actuator with excellent vibration characteristic.

DESCRIPTION OF EMBODIMENTS

1. First Embodiment

1-1. Configuration

Figure 1:
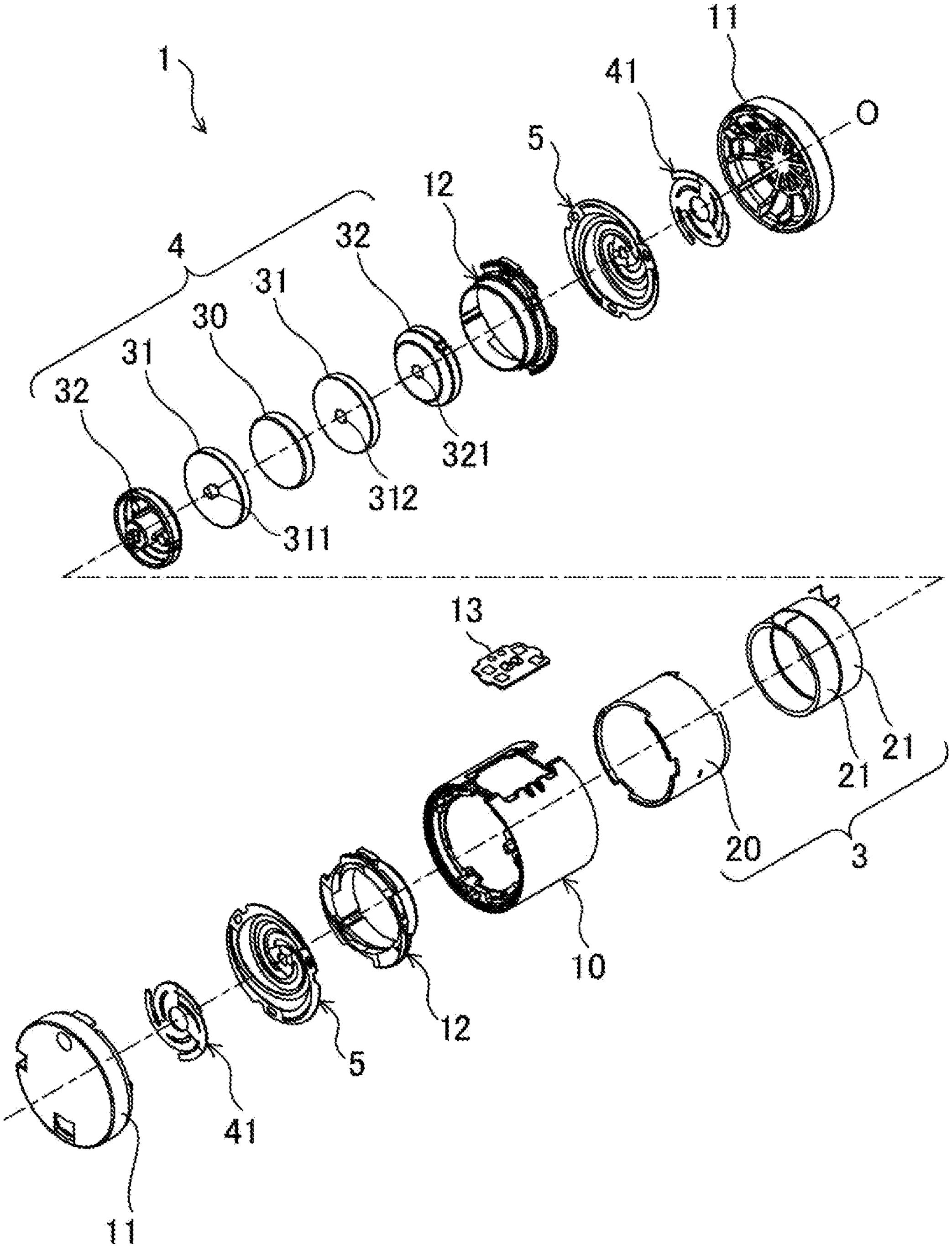
FIG. 1 is an exploded perspective view illustrating an entire configuration of the first embodiment.

Hereinafter, a vibration actuator of the first embodiment is described using FIGS. 1 and 2. A vibration actuator 1 of the present embodiment includes components of the same shape with a symmetrical plane (S in FIG. 2) perpendicular to a central axis at one half in the vibration-axis-O direction. Therefore, only configuration of each component at one side among the symmetrical component is described, and the description for the other will be omitted by adding the same signs unless required otherwise. Furthermore, "the center of the mover" means a center of the mover in the vibration-axis-O direction, in detail, the intersection point between the vibration-axis-O direction and the symmetrical plane S, and inward and outward direction with the vibration-axis-O direction as the center axis is expressed as the inner circumference and outer circumference based on the vibration-axis-O direction.

The vibration actuator 1 mainly includes a cylindrical casing 2 forming an outer shell, a casing-side electromagnetic driver 3 provided inside the casing 2, a mover 4 that can be vibrated by the casing-side electromagnetic driver 3, and a leaf spring 5 that elastically supports the mover 4 relative to the casing 2.

The casing 2 includes a cylindrical casing body 10, a cover casing 11 closing openings at both end of the casing body 10, and an inner guide 12 provided in the inner circumferential portion near the opening of the casing body 10. In the present embodiment, the casing body 10, the cover casing 11, and the inner guide 12 are formed of resin material such as ABS, however, the material is not limited to the resin material. A terminal 13 connected to an unillustrated lead wire is formed on an outer surface of the casing body 10.

An electromagnetic driver includes the casing-side electromagnetic driver 3 and a mover-side electromagnetic driver freely reciprocally supported in the casing body 10.

The casing-side electromagnetic driver 3 includes a yoke 20 fixed to the casing 2, and a coil 21. That is, the yoke 20 formed of soft magnetic material is arranged along the inner circumference of the casing 2, and the coil 21 is attached to the inner circumference of the yoke 20 and is electrically insulated from the yoke 21.

The coil 21 is wound along the inner circumference of the yoke 20 and is arranged to have predetermined distance from the outer circumference of the mover 4. To prevent the mover 4 and the coil 21 from contacting with each other when they vibrate, the inner guide 12 is fixed to the inner circumference of the casing body 10 so as to cover the surface of the coil 21 at the mover-4 side, and a gap is provided between an inner circumferential surface of the inner guide and an outer circumferential surface of the mover 4. The coil 21 can generate magnetic field by power conducted from the terminal 13. The coil 21 may be temporarily fixed to the yoke 20 and the inner guide 12, for example, by adhesive at the time of assembling. Furthermore, the coil 21 may be wound outside the casing 2, inserted into the casing body 10, and fixed by adhesive to the yoke 20 and the inner guide 12.

The mover 4 is arranged inside the casing body 10 so as to vibrate along the vibration-axis-O direction that is the central axial direction of the cylindrical casing 2. The mover 4 includes a mover body with disc magnet 30 and a weight 32 fixed to the magnet 30. The mover body has a disc pole piece 31 fixed to the magnet 30 at the opening-side of the casing 2 and the weight 32 arranged on a surface of the pole piece 31. Among these, the magnet 30 and the pole piece 31 form the mover-side electromagnetic driver.

The magnetization direction of the magnet 30 is in the vibration-axis-O direction. The pole piece 31 is formed of metallic soft magnetic material and is formed by a pressed metal plate. Furthermore, the pole piece 31 is attached to the magnet 30 such as by magnetic attraction of the magnet 30 and adhesive. As illustrated in FIGS. 2 and 3, a protrusion 311 protruding toward the opening of the casing 2 is provided at a center of the pole piece 31. In the present embodiment, since the pole piece 31 is press-molded to form the protrusion 311, a recess 312 is formed at the opposite side of the protrusion 311 of the pole piece 31. Meanwhile, a recess 321 which recessed toward the opening of the casing 2 is provided at a center of the weight 32 corresponding to the protrusion 311. The pole piece 31 and the weight 32 is fixed in a state in which the protrusion 311 is inserted into the recess 321. The assembly scheme of the magnet 30, the pole piece 31, and the weight 32 is not limited to assembling using magnetic attraction, adhesive, and insertion as described above, and they may be assembled by fixation using mechanical schemes such as screwing or other schemes.

Figure 2:
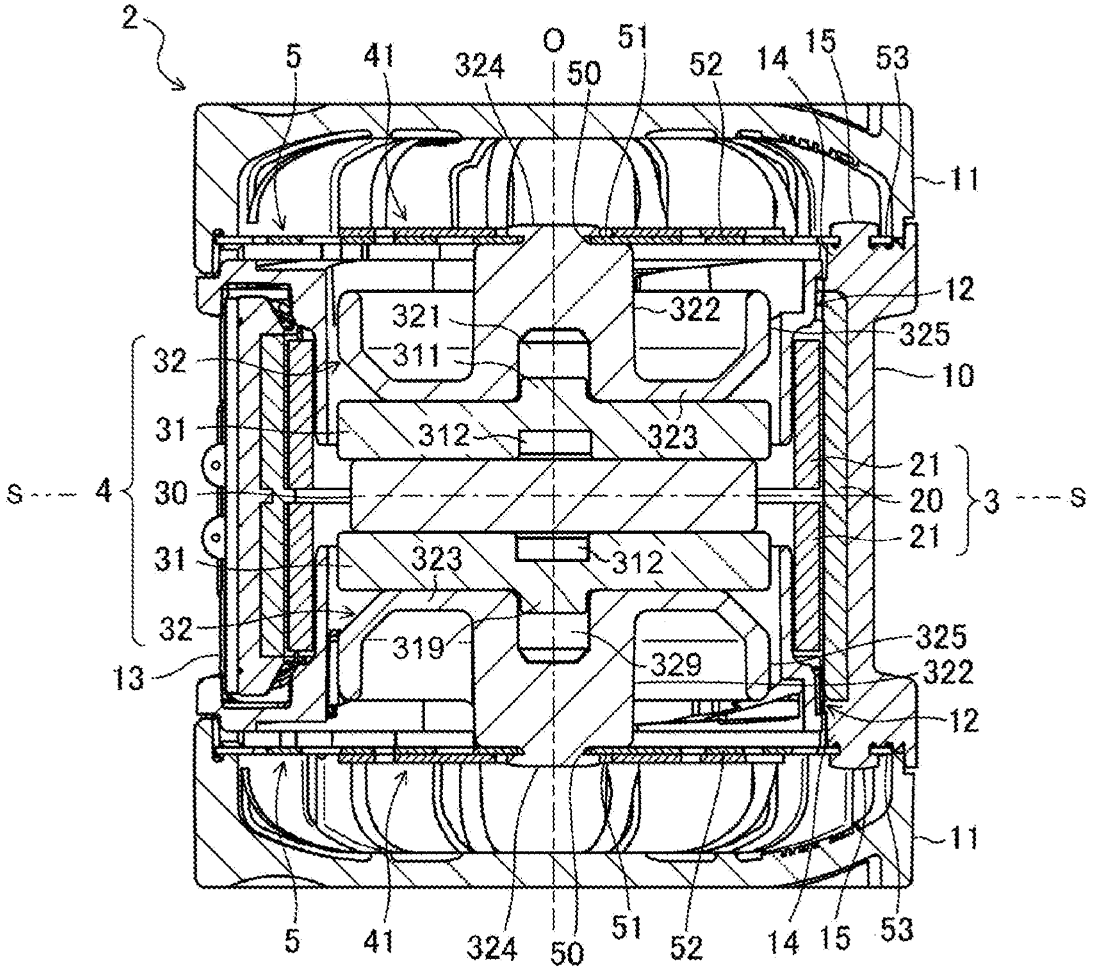
FIG. 2 is a cross-sectional view illustrating an entire configuration of the first embodiment along the vibration-axis direction.
Figure 3:
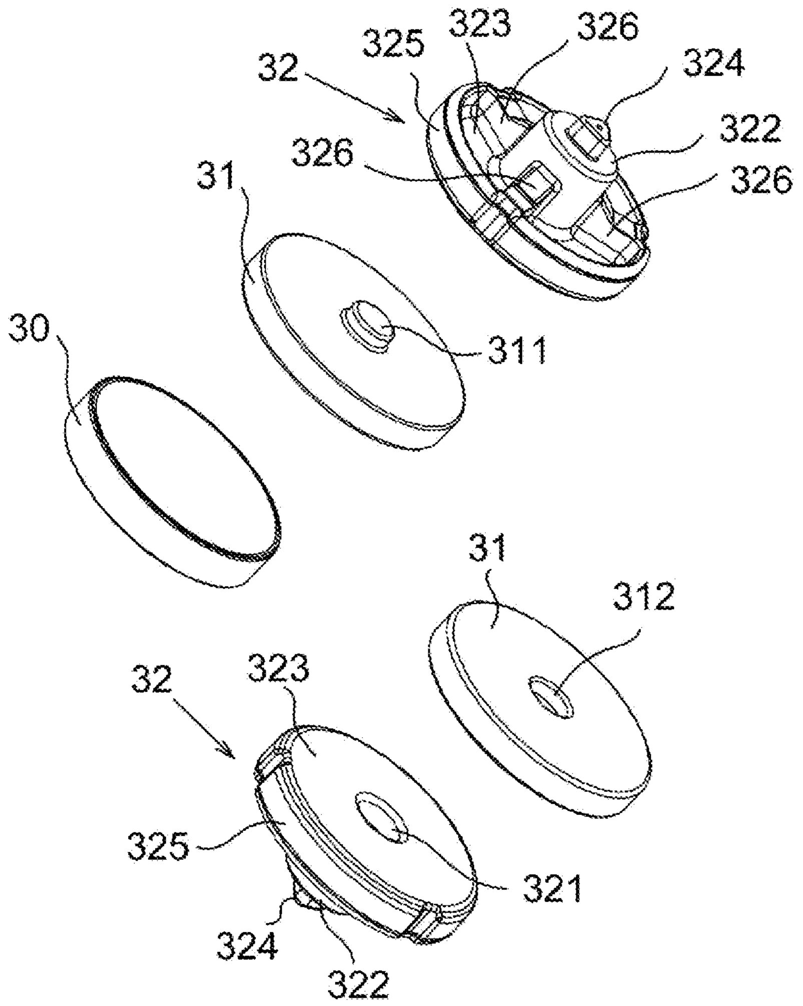
FIG. 3 is an exploded perspective view of a weight, a pole piece, and a magnet of the first embodiment.

As illustrated in FIG. 2, in the mover 4, the outer shape of the magnet 30 is radially smaller than the outer shapes of the pole piece 31 and the weight 32. That is, the outer circumference of the pole piece 31 and the weight 32 is located at the outermost circumference and is most close to the inner circumference of the coil 21.

As illustrated in FIGS. 2 and 3, the weight 32 is formed of non-magnetic material and is formed by resin and/or metal product. In the present embodiment, the entire weight is produced by die-casting in which molten metal is poured into a mold, however, the weight may be produced by using molding method such as resin molding, insert-molding metal into resin to adjust weight, hot isostatic pressing in which metal powder is supplied into a mold and is solidified, and metal injection molding (metal injection). The weight 32 includes a pillar 322 at the center thereof extending in the vibration-axis-O direction toward the opening-side of the casing 2, and a bottomed cylinder in which a bottom 323 expands from a root of the pillar 322 in the direction orthogonal to the vibration axis and in which a cylinder 325 is opened in the opening-side direction of the casing 2 to form U-shaped cross-section. A recess 321 which recessed toward the opening of the casing 2 is provided at a center of the pillar 322 at the magnet-30 side. The diameter of the recess 321 is larger than the diameter of a central shaft 324 of the weight 32.

As illustrated in FIGS. 2 and 3, the polygonal central shaft 324 protruding in the vibration-axis-O direction is provided at a center of a tip of the pillar 322 in the weight 32. For example, the central shaft 324 of the weight 32 is an equilateral triangle in which angles and sides are provided at an angle of 120 degrees, and corners of the triangle is curved. The cylinder 325 standing up toward the lead-spring-5 side is provided at an outer edge of the disc bottom 323, and three ribs 326 extending from the root of the pillar 322 to the cylinder 325 are radially provided at equal interval of 120 degrees.

Figure 7:
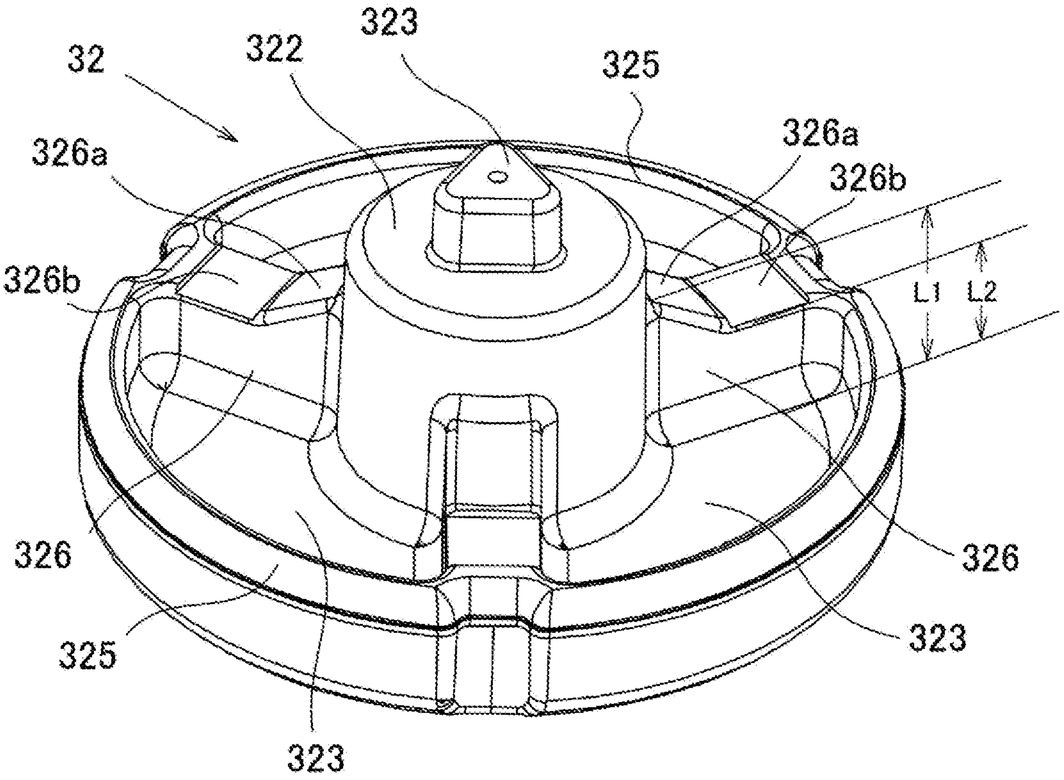
FIG. 7 is an enlarged view illustrating a shape of the weight in the first embodiment.

A center of the rib 326 in contact with the pillar 322 of the weight 32 is thicker than an outer circumference of the rib 326. In detail, as illustrated in FIG. 7, height L1 at the center of the rib 326 in contact with the pillar 322 of the weight 32 along the circumferential edge of the pillar 322 is different from height L2 at the outer circumference of the rib 326. Furthermore, the height of the rib 326 becomes higher along the vibration-axis-O direction so that L1>L2. Furthermore, an upper surface of the rib 326, that is, the rib 326 at the opening side of the casing 2 is formed by at least two planes with different inclinations. For example, the rib 326 may be formed by two planes with different inclinations such as an inclined surface 326*a* that is one third of the rib 326 from the center toward the outer circumference, and a plane surface 326*b* in parallel with the symmetrical plane S from the inclined surface to the cylinder 325.

Figure 6:
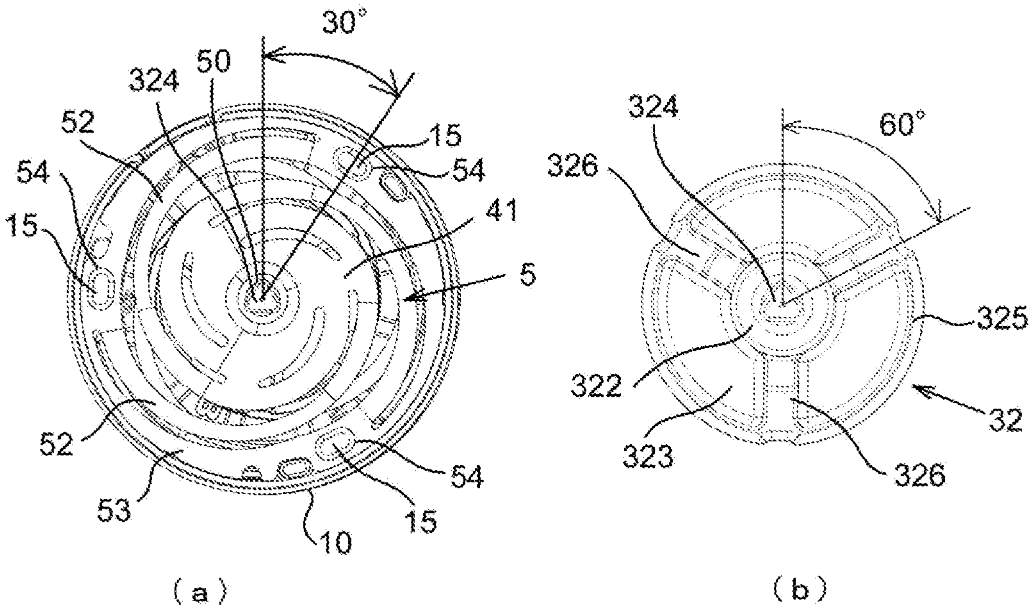
FIG. 6 is a planar view illustrating positional relationship of an angle between an axial hole and a central axis of a triangle, and a through hole or a rib in the first embodiment.

As illustrated in FIG. 3, the position of the rib 326 corresponds to the position of the angles of the triangular central shaft 324 and is set to have the suitable angle considering the vibration characteristic of the weight 32 and the leaf spring 5. That is, the angle between the weight 32 and the lead spring 5 is determined by the position of the angle of the central shaft 324, and the leaf spring 5 has portions with different rigidity to support the weight 32, such as arms and notches. Meanwhile, since the weight distribution of the weight 32 in the circumferential direction is not uniform due to the presence of three ribs 326, the positions of the angle of the central shaft 324 and the position of the ribs 326 are set considering the non-uniformity of the rigidity of the leaf spring 5 and the weight balance of each portion, so that less uneven vibration is produced. In the present embodiment, as illustrated in FIG. 6(*b*), the central shaft 324 and the ribs 326 are arranged so that the three angles of the central shaft 324 and the position of the ribs 326 are displaced from each other by 60 degrees based on the vibration axis O.

The leaf spring 5 is formed by one or multiple metal leaf springs, and for example, in the present embodiment, a processed thin plate of stainless steel is used. The material of the leaf spring 5 is not limited to metal and may be composite material containing resin and fiber. Furthermore, the material of the leaf spring 5 is desirably material with excellent durability and flexibility.

Figure 4:
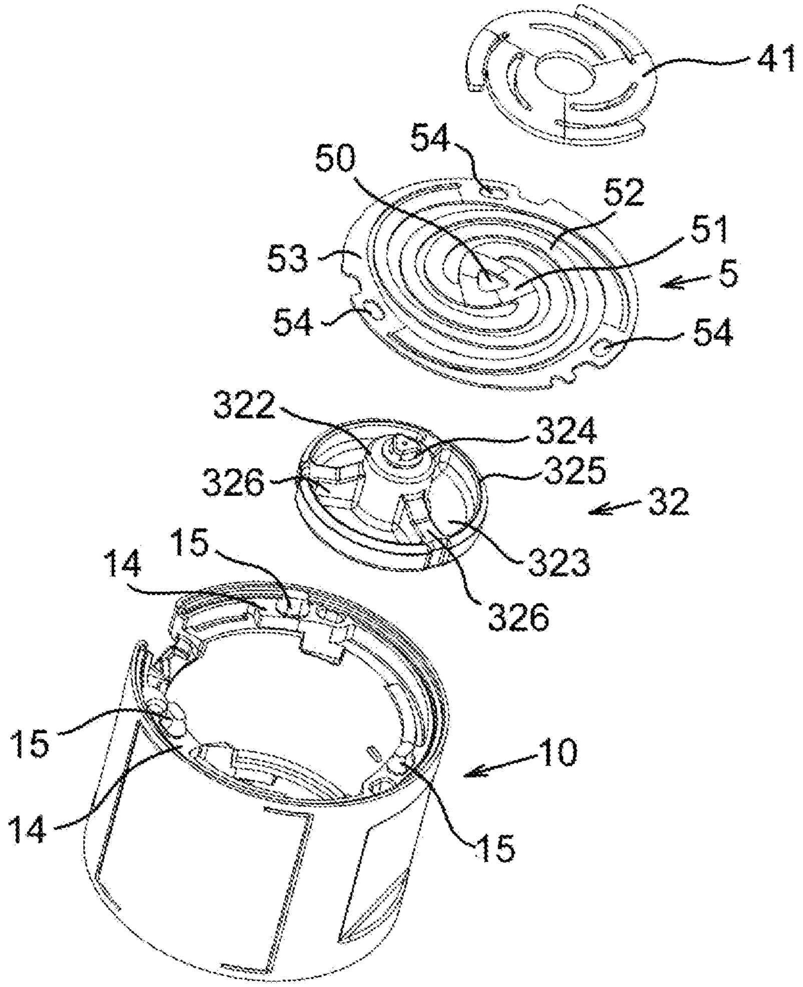
FIG. 4 is an exploded perspective view of a casing body, a weight, a coil spring, and a damping component of the first embodiment.
Figure 5:
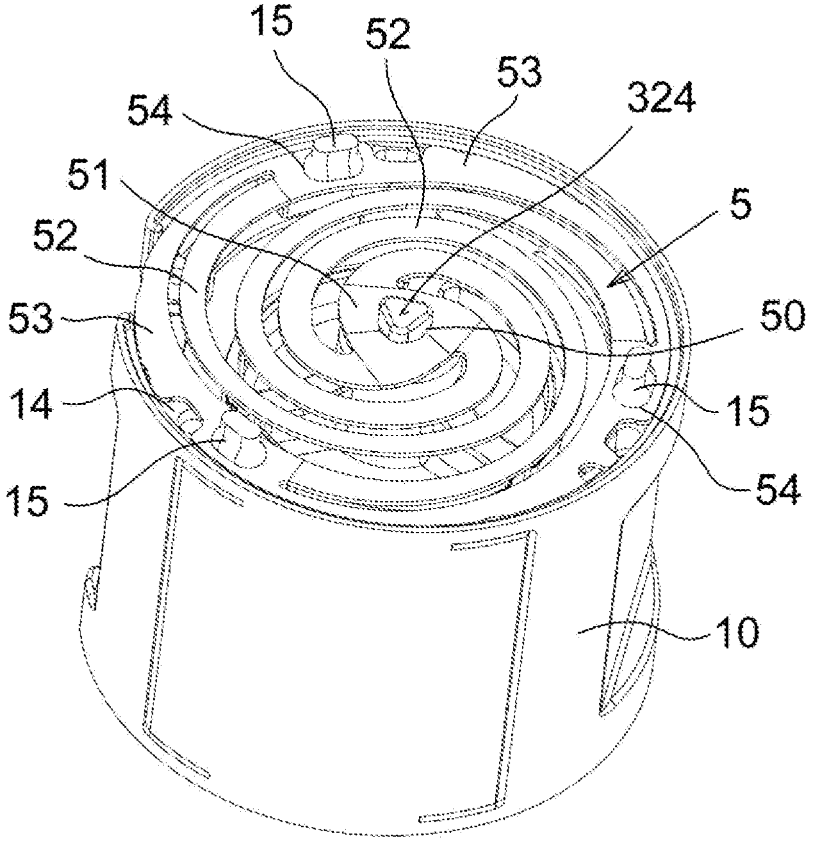
FIG. 5 is a perspective view of a casing body, a weight, a coil spring, and a damping component of the first embodiment combined together.

As illustrated in FIG. 4, a polygonal shaft hole 50 to fit the central shaft 324 of the weight 32 is provided at the center of the leaf spring 5. For example, this shaft hole 50 is an equilateral triangle in which angles and sides are provided at an angle of 120 degrees, and corners of the triangle is curved. The leaf spring 5 and the weight 32 is connected using this shaft hole 50. That is, the equilateral-triangular central shaft 324 of the weight 32 is inserted into the equilateral-triangular shaft hole 50 to match the positions of the weight 32 to the leaf spring 5. Then, the central shaft 324 protruding from the surface of the leaf spring 5 is heated or pressurized and crushed by a jig to superposition and swage the weight 32 and the lead spring 5. The fixing scheme of the leaf spring 5 and the weight 32 is not limited to swaging, and they may be fixed (connected) by other schemes such as screwing or adhesion if they include the polygonal central axis 324 and the shaft hole 50.

As illustrated in FIG. 4, the leaf spring 5 has three arms 52 extending spirally toward the outer circumferential direction from a support 51 provided in the inner circumferential portion of the leaf spring 5. The arms 52 are provided around the vibration axis O at an equal interval of 120 degrees. An outer end of each arm 52 is connected to an annular frame 53 provided in the outer circumference of the lead spring along the inner circumference of the casing body 10.

In the present embodiment as described above, two leaf springs 5 are provided symmetrically relative to the symmetry interface. The spiral direction of the arms 52 of two leaf springs 5 are opposite from each other. By this, when the actuator vibrates, the mover 4 does not rotate around the vibration axis O while reciprocating in the vibration-axis-O direction because torque of opposite direction is applied from two lead springs 5.

As illustrated in FIG. 4, a flange 14 protruding inward in the radial direction of the casing body 10 is provided on the end surface of the cylindrical casing body 10, and three protrusion 15 extending in the vibration-axis-O direction is provided to this flange 14 at an interval of 120 degrees.

Three through holes 54 to insert the protrusions 15 are provided to the frame 53 of the leaf spring 5 at an interval of 120 degrees. In this case, as illustrated in FIG. 6(*a*), the shaft hole of the leaf spring 5 and three through holes 54 are arranged so that the three angles of the triangular central shaft 324 of the weight 32 and three angles of the triangular shaft hole 50 provided in the leaf spring 5, and the position of three through holes 54 provided in the leaf spring are displaced from each other by 30 degrees based on the vibration axis O.

By heating or pressurizing and crushing the tip of each protrusion 15 by a jig while the protrusions are inserted in the respective through holes 54, the frame 53 of the leaf spring 5 and the end surface of the casing body 10 are superpositioned and swaged. The fixing scheme of the frame 53 and the leaf spring 5 is not limited to swaging, and they may be fixed by other schemes such as screwing or adhesion.

The leaf spring 5 with such configuration can be elastically deformed within a predetermined range in the vibration-axis-O direction and the symmetry-interface-S direction. Note that this predetermined range corresponds to the amplitude range of the mover 4 when the vibration actuator 1 is normally used. Therefore, the predetermined range is a range in which at least the leaf spring 5 does not contact the casing 2 and which does not exceed the elastic deformation limit of the leaf spring 5.

In the present embodiment, a damping component 41 to control the vibration characteristic is provided in the leaf spring 5. As illustrated in FIG. 4, the damping component 41 is fixed to one surface of the leaf spring 5 with an external plate shape along the shape of the leaf spring 5 in a certain range from support 51 to the arm 52. The damping component 41 includes a first adhesive layer formed of adhesive laminated on the lead spring 5, a PE layer formed of PE (polyethylene), a second adhesive layer formed of adhesive, and an elastomer layer formed of an elastomer. The elastomer may be suitably a thermoplastic polyurethane elastomer (TPU), however, it is not limited thereto. The lead spring 5 is damped by the elastic deformation of the damping component, specifically, the shear deformation of the PE layer and the adhesive layer and the bending deformation of the elastomer layer. The fixing scheme of the damping component 41 and the leaf spring 5 is not limited to the above adhesion, and other fixing schemes such as thermal-welding of the resin damping component 41 to the leaf spring 5 may be used.

1-2. Action of Embodiment

As illustrated in FIG. 2, in the vibration actuator 1 configured as described above, the mover 4 supported by the lead spring 5 is located at the center in the vibration-axis-O direction when the coil 21 is not conducted.

Figure 8:
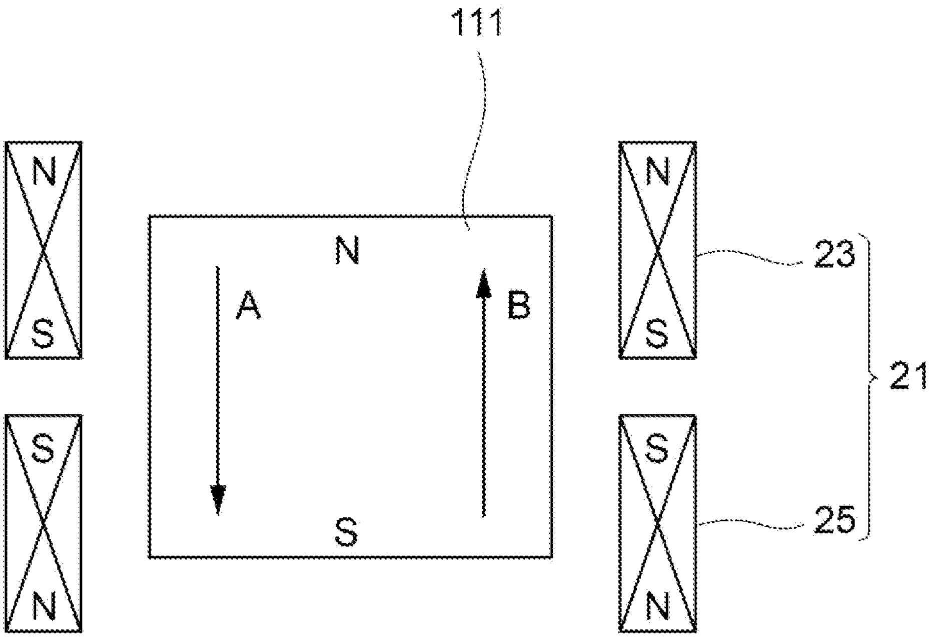
FIG. 8 is a diagram describing an operation of the first embodiment.

When to vibrate the mover 4, alternating current is conducted to the coil 21 via the terminal 13 in the direction that alternately generates a magnetic field with opposite polarity. That is, the same pole is generated in the adjacent portions of the coil 21. For example, in the case of the polarity indicated in FIG. 8, thrust toward the other side (downward in FIG. 8) in the vibration-axis-O direction indicated by the solid arrow A is produced at the mover 4, and when the current flowing in the coil 21 is revered, thrust toward one side (upward in FIG. 8) in the vibration-axis-O direction indicated by the solid arrow B is produced at the mover 4. Accordingly, when the alternating current is conducted in the coil 21, the mover 4 vibrates in the vibration-axis-O direction while receiving bias force by the leaf spring 5 from both sides.

The thrust produced at the mover 4 basically follows thrust applied based on the Fleming's left-hand rule. In the present embodiment, since two coils 21 arranged symmetrically is fixed to the casing 2, thrust as reaction force to the force generated at two coils 21 is produced at the mover 4 attached to, for example, the magnet 30.

Therefore, due to the thrust acting in the vibration-axis-O direction and the thrust acting in the symmetry-surface-S direction of the magnetic flux of the magnet 30, force to rotate the weight 32 around the vibration-axis-O direction is applied. At this time, the corners of the equilateral triangular central shaft 324 provided in the weight 32 acts as a rotation stopper, and the mover 4 vibrates along the vibration-axis-O direction.

1-3. Effect of Embodiment (1) In the present embodiment, the mover 4 and the weight 32 are fixed in a state in which the protrusion 311 provided in the mover 4 is inserted into the recess 321 of the weight 32. Therefore, it is not necessary to provide protrusion in the weight 32, so that the weight 32 can be easily formed.

(2) In the present embodiment, the pole piece 31 and the weight 32 are fixed in a state in which the protrusion 311 provided in the pole piece 31 is inserted into the recess 321 of the weight 32. Therefore, since the pole piece 31 does not have a through hole and magnet field lines from the magnet 30 can be found in all region of the pole piece 31 and flow into the pole piece 31, the magnetic field lines from the magnet 30 does not leak and the mover 4 can be reciprocated by effectively using the magnetic force generated at the coil 21, so that excellent vibration characteristic can be achieved.

(3) The recess 321 which is recessed toward the opening of the casing 2 is provided at the central portion of the weight 32. Therefore, the molding material can easily from into the mold, and the weight can be easily manufactured even with small size and complex shape, and the vibration actuator with excellent vibration characteristic can be obtained.

(4) In the present embodiment, the diameter of the recess 321 of the weight 32 is larger than the diameter of the central shaft 324 of the weight 32. Therefore, the molding material can easily from into the mold, and the weight can be easily manufactured even with small size and complex shape. Furthermore, an area of the plane right under the swaged shape becomes larger when the central shaft 324 of the weight 32 protruding from the surface of the lead spring 5 so that the weight can be stably fixed. In addition, since the diameter of the recess 321 of the weight 32 is larger than the diameter of the central shaft 324 of the weight 32, a convex portion like the central shaft 324 can be easily formed.

(5) In the present embodiment, the weight 32 includes the bottomed cylinder in which the bottom 323 expands in the direction orthogonal to the vibration axis O and in which a cylinder 325 is opened in the opening-side direction of the casing 2 to form a U-shaped cross-section. Therefore, even when impact is added from outside, the cylinder 325 of the weight 32 contacts with the inner guide 12 and the mover 4 can be prevented from contacting with the coil 21, enabling to prevent operation failure and production of noise.

(6) In the present embodiment, the pillar 322 which is recessed toward the opening of the casing 2 in the vibration-axis-O direction is provided at the central portion of the weight 32. Therefore, the weight with optimum weight and high strength can be easily manufactured and the vibration actuator with excellent vibration characteristic can be provided.

(7) In the present embodiment, the outer circumference of the cylinder 325 is located at the outermost circumference of the mover 4. Therefore, even when impact is added from outside, the cylinder 325 of the weight 32 contacts with the inner guide 12 and the mover 4 can be prevented from contacting with the coil 21.

(8) In the present embodiment, the ribs 326 are radially provided at equal intervals between the root of the pillar 322 and the cylinder 325. Therefore, the cylinder 325 can keep high strength even when it is formed thin, and the vibration actuator with excellent vibration characteristic can be provided.

(9) In the present embodiment, the center of the rib 326 in contact with the pillar 322 of the weight 32 is thicker than an outer circumference of the rib 326. Therefore, the molding material can easily from into the mold, and the weight can be easily manufactured. Furthermore, since the center of the weight 32 becomes heavier, the weight balance of the entire mover can be improved. Furthermore, when swaging the central shaft 324 of the weight 32 protruding from the surface of the leaf spring 5, since the center of the weight 32 is thick, the central shaft 324 can be stably swaged.

(10) In the present embodiment, the upper surface of the rib 326, that is, the rib 326 at the opening side of the casing 2 is formed by at least two planes with different inclinations. Therefore, the molding material can easily from into the mold, and the weight can be easily manufactured even with small size and complex shape.

Other Embodiment

As described above, although several embodiments of the present disclosure are described, the embodiments are not intended to limit the scope pf claims, and as cited below, the embodiments can be implemented by various forms without departing from the abstract of the invention, and various omission, replacement, and modification may be made. Furthermore, these embodiments, combination, and modification thereof are included in the scope and abstract of the invention, and are included in the invention described in the scope of the claims. In below, example embodiments included in present disclosure will be described.

(1) For example, although the protrusion 311 of the pole piece 31 and the recess 321 of the weight 32 are provided at the center in the above embodiment, it is not necessary to provide them at the center. Furthermore, the number of the protrusion 311 and the recess 321 is not limited to one and may be a plurality if the number of both are the same.

(2) In the present embodiment, although the ribs 326 are radially provided at equal intervals between the root of the pillar 322 and the cylinder 325, it is not necessary to provide the ribs 326 at equal intervals if the ribs 326 reinforce the strength of the pillar 322 and the cylinder 325. Furthermore, the shape of the rib is not limited to a radial shape, and may be a lattice shape or a spiral shape.

(3) In the present embodiment, although the center of the rib 326 in contact with the pillar 322 of the weight 32 is thicker than an outer circumference of the rib 326, that is, the center of the rib 326 in contact with the pillar 322 of the weight 32 is the highest in the vibration-axis-O direction, the center of the rib 326 in contact with the pillar 322 of the weight 32 may be formed to be the longest in the symmetrical-plane-S direction.

(4) In the present embodiment, although the leaf spring 5 has the damping component 41, it is not necessary to have the damping component.

(5) Although the casing 2 of the above embodiment is cylindrical and the mover 4 is substantially pillar-shape, the shape of the casing and the mover is not limited thereto and may be polygonal or other shape.

(6) In the above embodiment, although the protrusion 311 is provided in the pole piece 31 of the mover, the protrusion may be provided in other component of the mover such as the surface of the magnet 30, or on a surface of other component when other component is covered on or laminated on the weight-side of the pole piece 31.

What is claimed is:

1. A vibration actuator comprising:
a casing with cylindrical shape;
a coil provided in the casing; and
a mover that vibrates along a vibration-axis direction of the casing,
wherein:
the mover includes a mover body and a weight fixed to the mover body,
a protrusion protruding toward an opening of the casing is provided at a central portion of the mover body,
a recess which is recessed toward the opening of the casing is provided at a central portion of the weight, and
the mover body and the weight are fixed in a state in which the protrusion is inserted into the recess.

2. The vibration actuator according to claim 1, wherein the mover body includes a pole piece and a magnet.

3. The vibration actuator according to claim 2, wherein the pole piece is fixed in the magnet at an opening-side of the casing, and a protrusion is provided at a center of the pole piece.

4. The vibration actuator according to claim 1, wherein a diameter of the recess of the weight is larger than the diameter of a central shaft of the weight.

5. The vibration actuator according to claim 1, wherein the weight includes a bottomed cylinder in which a bottom expands in a direction orthogonal to a vibration axis and in which a cylinder is opened in an opening-side direction of the casing.

6. The vibration actuator according to claim 5, wherein the weight includes a pillar which extends toward an opening-side of the casing in the vibration-axis direction and which is integrated with the bottomed cylinder at the central portion thereof.

7. The vibration actuator according to claim 5, wherein an outer circumference of the cylinder of the bottomed cylinder is located at an outermost circumference of the mover.

8. The vibration actuator according to claim 6, wherein a rib is provided between a root of the pillar and the cylinder in the weight.

9. The vibration actuator according to claim 8, wherein a center of the rib is thicker than an outer circumference of the rib.

10. The vibration actuator according to claim 8, wherein a side surface of the opening of the casing of the rib is formed by at least two planes with different inclinations.

* * * * *